United States Patent [19]

Lum et al.

[11] Patent Number: 5,696,931
[45] Date of Patent: Dec. 9, 1997

[54] DISC DRIVE CONTROLLER WITH APPARATUS AND METHOD FOR AUTOMATIC TRANSFER OF CACHE DATA

[75] Inventors: Marvin Mang-Yin Lum; Don Michael Robinson, both of San Jose; Prafulla Bollampali Reddy; Kathleen Anne Duncan, both of Santa Cruz, all of Calif.

[73] Assignee: Seagate Technology, Inc., Scotts Valley, Calif.

[21] Appl. No.: 303,415

[22] Filed: Sep. 9, 1994

[51] Int. Cl.⁶ .................................................. G06F 12/08
[52] U.S. Cl. ............................................ 395/440; 395/464
[58] Field of Search ...................................... 395/468, 440, 395/464, 444, 439, 421.03

[56] References Cited

U.S. PATENT DOCUMENTS

| | | | |
|---|---|---|---|
| 5,317,713 | 5/1994 | Glassburn | 395/440 |
| 5,353,430 | 10/1994 | Lautzenheiser | 395/444 |
| 5,410,653 | 4/1995 | Macon, Jr. et al. | 395/440 |
| 5,448,715 | 9/1995 | Schultz | 395/468 |
| 5,455,954 | 10/1995 | Packer | 395/894 |
| 5,548,788 | 8/1996 | McGillis et al. | 395/851 |

OTHER PUBLICATIONS

Miyachi, Taizo et al, "Performance Evaluation for Memory Subsystem of Hierarchical Disk–Cache", Systems and Computers in Japan, v. 17, N. 7, Sep. 1985, pp. 86–94.
Brown, Michael, et al, "Look–Ahead Cache Cuts Disk Transfer Time, Increases Throughput", Computer Technology Review, Iss. 9, 1987, p. 71+.
Treiber, Kent et al, "Simulation Study of Cached RAIDS Designs", High Performance Comp. Arch, 1995 Symposium, pp. 186–197.
Gibson, Garth A. et al, "Disk Reads With DRAM Latency", Workstation Operating Systems, 1992, pp. 126–131.

*Primary Examiner*—Eddie P. Chan
*Assistant Examiner*—Kevin L. Ellis
*Attorney, Agent, or Firm*—Flehr Hohbach Test Albritton & Herbert LLP

[57] ABSTRACT

A disc controller services a host "read" command, without intervention by the disc controller's microcontroller, if the requested data is found in the disc controller's cache. The disc controller stores at least one cache entry. Each cache entry includes an address, a logical Bit, a valid Bit and a set of four buffer parameters: upper limit address, base address, pointer to the sector count and sector count. Each host command is decoded by the disc controller, and if the command is a "read" command the address in the cache entry is compared against the address in the host command. If the addresses match and the cache entry address is marked as being valid by its Valid bit, a "cache hit" signal is generated and the disc controller starts transferring the data requested by the host without waiting for the disc controller's microprocessor to process the host command. In particular, a sequencer and data transfer circuitry automatically generate a host interrupt request signal and transfer to the host at least a subset of the requested set of data blocks specified by each read command when a cache hit signal is generated. The disc controller includes circuitry for updating the information stored in the cache entry so that said updated information stored in the cache entry identifies data blocks in the cache sequentially subsequent to those data blocks transferred to the host.

10 Claims, 8 Drawing Sheets

DISC DRIVE CONTROLLER WITH APPARATUS AND METHOD FOR AUTOMATIC TRANSFER OF CACHE DATA

FIELD OF THE INVENTION

This invention relates generally to cache memories in disc controllers, and more particularly relates to an apparatus and method for automatically transferring data requested by a host device's "read" command when the data requested is in the disc controller's cache memory.

BACKGROUND OF THE INVENTION

Glossary of terms

Definitions of the following terms used in this document are provided to assist the reader:

Address: A character or group of characters that identifies a register, a particular part of storage, or some other data source or destination.

Associative Cache: A storage device whose storage locations are identified by their contents, or part of their contents, rather than by their names or position.

Buffer: A portion of storage used to hold input or output data temporarily.

Cache: A special-purpose buffer storage, smaller and faster than main storage, used to hold a copy of data obtained from main storage and likely to be needed next.

Data: A re-interpretable representation of information.

Disc: A round flat data storage medium that is rotated while data is Read from or Write to the data storage medium.

FIFO: A "First In First Out" data buffer.

Host: A computer that provides services to end users.

Interface: Hardware, software or both that links systems together.

Interrupt: An instruction that directs the processor to suspend what it is doing and run a specified routine.

Logical address: A value indicating the relative position of a set of information in a larger block of information. A sequence of portions of a contiguous block of information will typically have sequential logical addresses, even if these portions have non-sequential physical addresses. Contrast with Physical address.

Microprocessor: A micro-chip containing integrated circuits that executes instructions.

Microsecond: one millionth of a second.

ms=millisecond: one thousandth of a second.

Parity: A data transmission attribute used to detect errors in data transmissions.

Physical address. A value indicating the physical location of a set of information in a memory device, such as a disc.

Program: A sequence of instructions suitable for processing by a computer.

RAM: Random access memory.

Read: To acquire or interpret data from a storage device.

Register: A pad of storage having a specified storage capacity and usually intended for a specific purpose.

Sector: On disc storage, an addressable subdivision of a track used to record one block of data or program instructions. Typically, one sector is the disc storage unit used to store 256, 512, 1024 or 2048 bytes.

Disc Caches

All state-of-the-art Hard Disc Drives use a Disc Cache to improve performance. A Cache is a special-purpose buffer storage, smaller and faster than main storage, used to hold a copy of data obtained from main storage and likely to be needed next. In prior art devices, when a host computer requests data, the disc controller receives the "read" command and interrupts the microcontroller.

The microcontroller then decodes the command, compares the address of requested data to the address of data in cache. When the requested data is already present in the disc cache, that is called a cache hit. If the requested data is not present in the disc cache, the microcontroller retrieves the requested data and stores it in the disc cache. As soon as the requested data is determined to be in the disc cache, the microcontroller informs the disc controller to send an interrupt signal to the host and to start the transfer of the requested data to the host.

Since the microcontroller handles other tasks as well, the above described process is slow and can take up to 1 millisecond even if data requested is found in the disc cache.

SUMMARY OF THE INVENTION

The Disc Cache Management Unit (DCMU) of the present invention allows the disc controller to transfer requested data to the host without waiting for the microcontroller to process the host request if the requested data is determined by hardware in the DCMU to be in the disc cache. This improves the disc controller's performance since it takes only a few microseconds to complete the "read" process.

The DCMU methodology of the present invention can be applied to any disc controller with any kind of host interface or chip architecture. An AT Disc Controller chip from Seagate Technology is used as an example to illustrate and describe the invention, but the scope of the invention is not limited by the chip architecture used in this example.

The AT Disc Controller is designed to support the standard ATA interface for PC-AT computers, to operate a buffer memory (the disc cache) and to interface with various disc data interfaces. The Disc Controller uses a sequencer to control the transfers between the buffer memory and the host.

The buffer memory has an interface that includes a set of registers to provide circular buffer support. Four parameters are used to set up the circular buffer: a base address, an upper limit address, a pointer to the current sector, and a count of valid sectors in the circular buffer. Two sets of registers are used for storing these parameters: a "current" set and a "next" set.

The disc controller stores one or more cache entries to represent one or more blocks of data stored in the disc cache. Each cache entry consists of an address, a Logical bit to indicate whether the address is a logical or physical address, a Valid bit to indicate whether or not the cache entry is valid, and a set of the four circular buffer parameters: upper limit address, base address, pointer to the current sector, and sector count. In one implementation of the present invention, only one cache entry is supported by the disc controller.

When the disc controller receives a command from the Host computer, the host command is stored in a "task file". The host command includes a command code, an address, a sector count, all of which are stored in the task file. The disc controller decodes the command code to determine whether it is a "read" request. The address or addresses of the cache entry or entries are compared against the address in the task file.

If any cache entry matches the address specified in the read request, the cache entry that matched the address is selected and the valid bit in the cache entry is checked. Then if the command is "read", and the entry is valid and the address in the task file matches with the cache entry address, the DCMU generates a "cache hit" signal. When a cache hit signal is generated, the sequencer loads the four buffer parameters from the selected cache entry onto the "current" set of registers and then the sequencer initiates the transfer of requested data to the host.

A Full Cache Hit occurs when the sector count in the Task File is less than or equal to the sector count in the Cache Entry.

A partial cache hit is when the sector count in the host command (and thus in the Task File) is greater than the sector count in the cache entry. In other words, the number of sectors requested by Host is greater than the number of sectors in Cache. In this situation, the microcontroller will begin the process of loading the additional sectors needed to satisfy the request from the disc to the disc cache while the DCMU initiates the transfer of the portion of the read request that can be satisfied with data resident in the disc cache.

Each time a sector is transferred to the host computer, the AT sequencer updates the cache entry to point to the next sequential location in the buffer memory. To accomplish this, the AT sequencer updates the 28-bit address field, decrements the "sector count" parameter, and loads the "current pointer" parameter back to the cache entry. The upper limit and base parameters are not updated, unless the microcontroller has moved the buffer location. Note that the address field in the cache entry is not updated if microcontroller has invalidated the entry by writing a 0 to the Valid bit.

As long as all the requested sectors are in the cache memory in a cache hit, the DCMU can handle any number of cache hits without microcontroller intervention. To notify the microcontroller of the DCMU's status, the DCMU provides a 4 bit status to the microcontroller. The four bits are:

ACR Completed

Auto Cache Read Completed. It is set when one or more Full Cache hit commands have been completed since the last time it was cleared.

Cmd Active

Command Active. It is set if the Disc Controller is currently servicing a Host Command.

ACR In Prog

Auto Cache Read in Progress. It is set if the Disc Controller is currently servicing a Full Cache hit.

Cache Hit

It is set if the Disc Controller is currently servicing a Full or Partial Cache hit.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
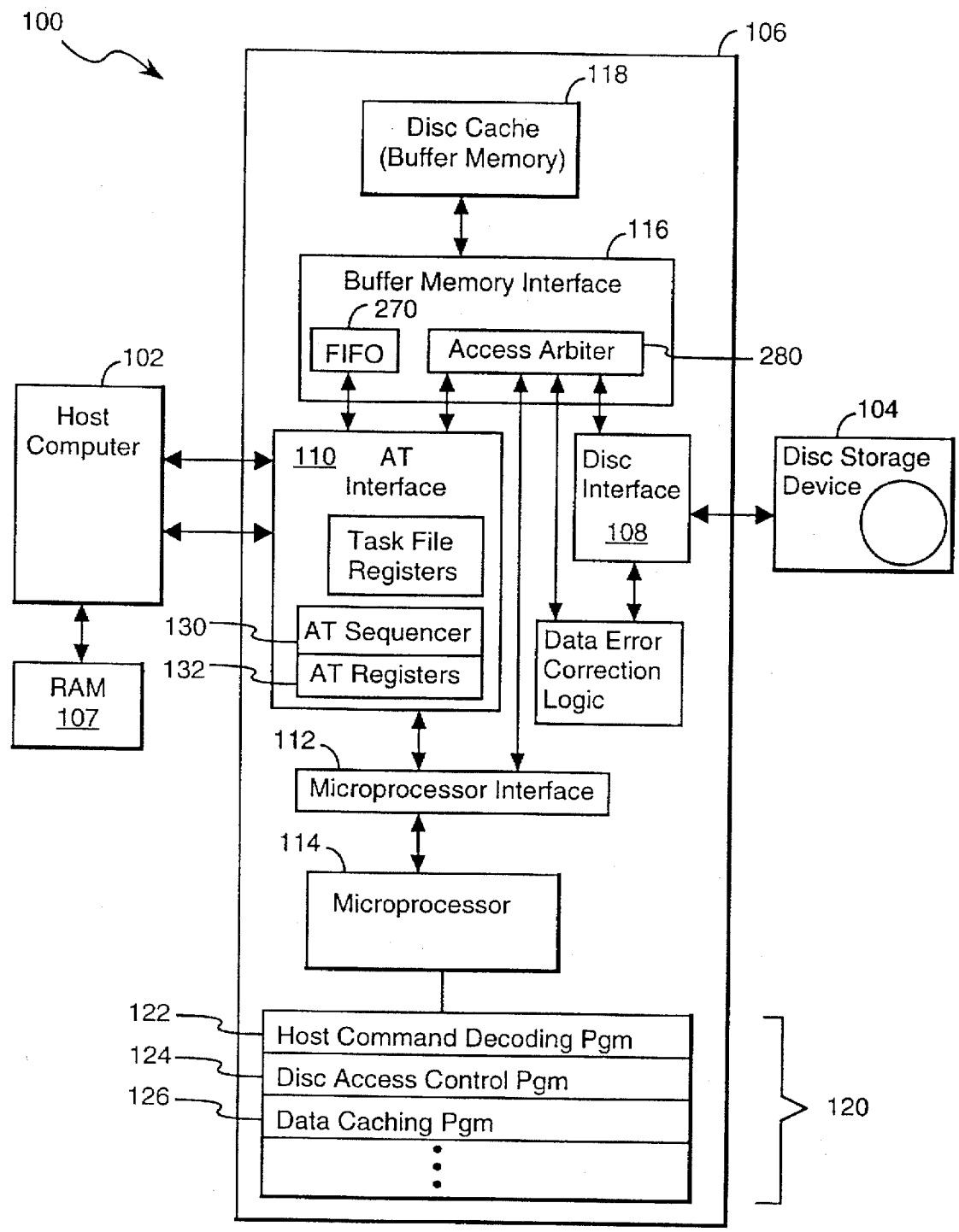
FIG. 1 is a block diagram of a Disc Controller linked to a Disc Cache, a Host computer, a Microprocessor, and a Disc Storage device.

FIG. 1, shows a computer system 100 having a Host computer 102 linked to a Disc Storage device 104 by a Disc Controller 106. The Disc Storage device 104 is typically a hard magnetic disc, but can be any secondary Memory device having an access time that is significantly longer than that of the random access memory (RAM) devices 107 used in the computer system (typically more than ten times slower than RAM 107).

The Disc Controller 106 includes a number of internal Interfaces, including a Disc Interface 108 linking the Disc Storage device 104 to the Disc Controller 106, a Host Interface 110 (herein called the AT Interface) linking the Host computer 102 to the Controller 106, a Microprocessor Interface 112 linking a Microprocessor 114 (sometimes called a Microcontroller) to the Controller 106, and a Buffer Memory Interface 116 linking the Controller 106 to a Disc Cache Memory 118.

The Microprocessor's software programs are shown collectively as block 120 in FIG. 1. These programs are responsible for transferring data from the Disc Storage device 104 through Disc Interface 108 and AT Interface 110 to Host computer 102. The software 120 includes a Host Command Decoding Program 122, Disc Access Control Program 124 and Data Caching Program 126.

In the present invention, the AT Interface 110 will read and decode Commands requested by the Host 102. If the requested data is determined by the hardware in the AT Interface to be in the Disc Cache 118, then the data is transferred from the Disc Cache 118 through the Buffer Memory Interface 116, and AT Interface 110 to Host computer 102 without Microcontroller intervention. While disc controllers generally include microcontroller software programs that perform the functions of host command decoding, disc access, and data caching, those programs are modified somewhat by the present invention. In particular, the Host Command Decoding Program 122, Disc Access Control Program 124, and Data Caching Program 126 have been revised to accommodate the fact that the AT Interface 110 can handle some disc read commands (full cache hits) completely and other disc read commands (partial cache hits) partially without execution of the software programs 120 by the microprocessor 114.

It is also important that the software 120 be altered to be retriggerable, so that in addition to recognizing that the host interface hardware 110 has executed a data transfer, the disc caching program 126 continues filling the Buffer Memory 118 with additional (typically sequential) sectors of data from the disc storage device 104 in anticipation of additional read commands from the host computer.

The Microprocessor 114 performs all the functions necessary to support the standard AT Interfaces 110 for PC/AT computers, including transferring information to and from the dynamic RAM Buffer 118, and controlling the Disc Interface 108 with various Disc Storage devices 104.

As will be described in greater detail below, the AT Interface block 110 uses a Sequencer 130 to control the transfers between the Buffer Memory 118 and Host 102. The details of the Sequencer 130 are disclosed in an application by Kathleen Duncan entitled Improved ATA-IDE Programmable Hard Disk Controller Sequencer, Ser. No. 08/202,391, filed Feb. 25, 1994, assigned to the assignee of the present invention and incorporated herein by reference.

Under the protocols known in the prior art, the Data Caching Program 126 sets up pointers and registers in the Disc Controller only to satisfy a Current Command. In the present invention, the microprocessor's software 120 and the AT sequencer work together to continually update the pointers and registers in the Disc Controller to support data transfers from the Buffer Memory 118 during a continuous sequence of transfers.

In the preferred embodiment, the Host Command Decoding Program 122 is modified in order to detect the status of the Status Bits 210 (shown in FIG. 3) and to interpret them to allow for the continued efficient operation of the DCMU.

It should be noted that much of this disclosure is couched in terms of transfer of a sequential series of sectors from the Disc Cache 118 to the Host 102. There is an alternative embodiment, which will be discussed with respect to FIG. 8, that allows the transfer of a sequential or non-sequential series of sectors, as long as the requested data resides in the Disc Cache and there is an appropriate Cache Entry in the Disc Controller.

Figure 2:
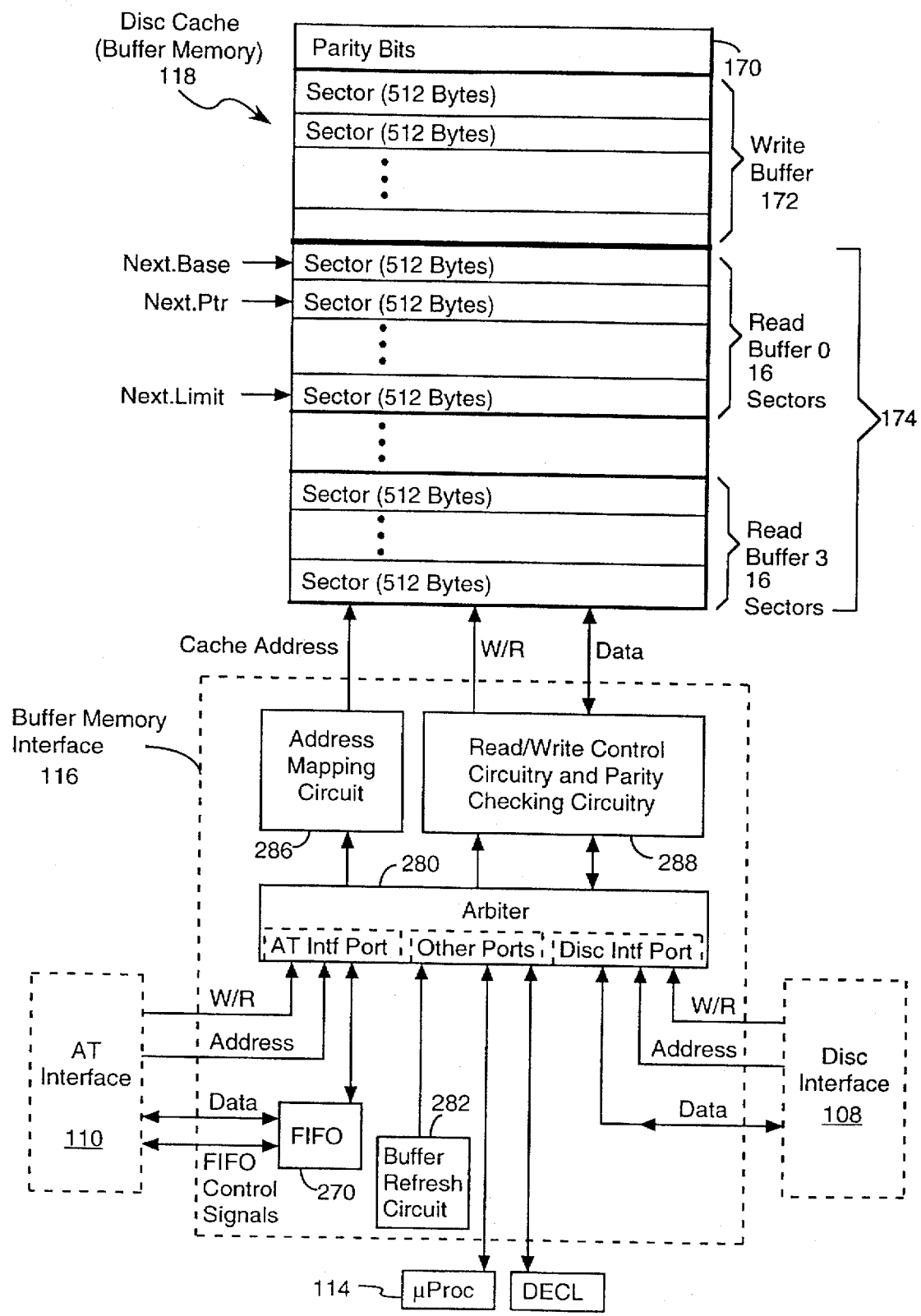
FIG. 2 is a block diagram of a Disc Cache Buffer Memory, Buffer Memory Interface, AT Interface and Disc Interface.

FIG. 2 shows the organization of the Buffer Memory 118, and the Buffer Memory Interface 116. The ability to transfer a group of sectors which are not numerically consecutive to a previously transferred group of sectors from the Buffer Memory 118 is in fact partially dependent on its organization.

One sixteenth of the Buffer Memory 118 is a location 170 devoted to storage of Parity Bits for the various sectors. In the remaining area of the Buffer Memory 118, approximately ½ is a Write Buffer 172 which is not further relevant to this invention; the remainder is a set of Read Buffers 174 that are labeled consecutively for purposes of this disclosure as Read Buffer 0 through Read Buffer 3. It would be possible to utilize this invention with a different number of Buffers or size of Sectors: buffers with more or less sectors, and/or sectors with more or less number of bytes. A standard organization form of the Memory is shown in FIG. 2. The Read Buffers 174 in the preferred embodiment store 64 sectors and these sectors are broken up into four sets of 16 sectors that are labeled herein as Read Buffer 0 through Read Buffer 3, all generally referred to by numeral 174.

An Arbiter 280 determines the priority to be given to a "Request for Access" by the Microprocessor 114, the AT Interface 110, the Disc Interface 108 or the Buffer Refresh Circuit 282. The AT Interface 110 requests are either a READ or a WRITE request followed by an Address. The Address Mapping Circuit 286 and Read/Write Control Circuitry and Parity Checking Circuitry 288 are standard in the technology.

Figure 3:
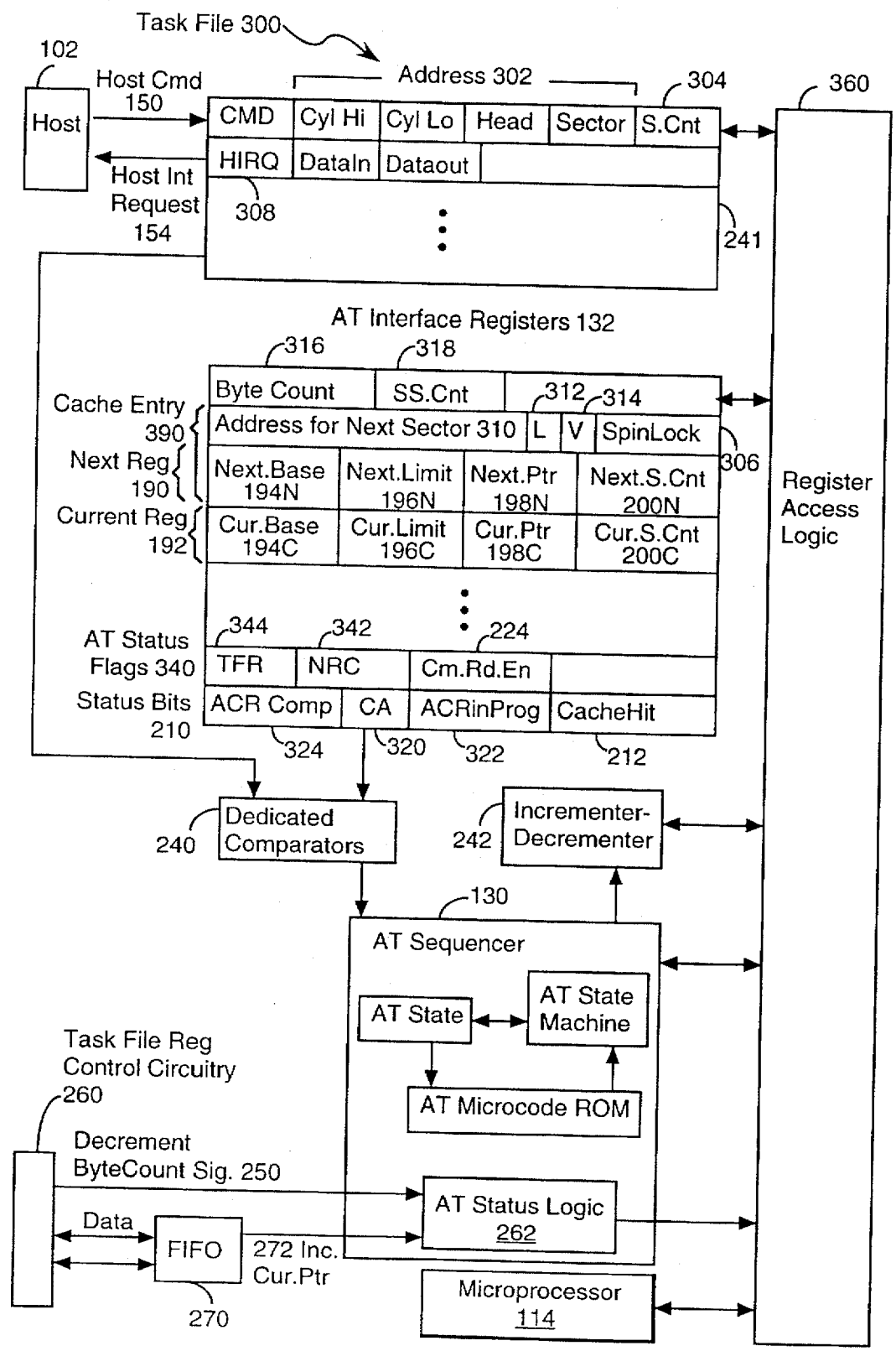
FIG. 3 is a block diagram of the present invention of the interface to the Host computer.

FIG. 3 is the block diagram of the AT Interface 110. The AT Interface Registers 132, the AT Sequencer 130, and Task File 300 are shown. The Task File 300 has an Address field 302 that holds the Address of the requested data, and a Sector Count 304 which is equal to the number of sectors requested. The AT Interface Registers 132 contains a Byte Count 316, which is the number of bytes yet to be transferred before the next host interrupt (i.e., until the transfer of a block of data is complete), and a Shadow Sector Count 318, which is the copy of the original Sector Count 304 (before being decremented by the AT sequencer 130) in the Task File 300. The Address for Next Sector 310 is the address of the data that is going to be transferred to the Host 102 and is the same as the Host Command Address 302 initially if it is a Cache Hit. The L Bit 312 indicates if the address is Logical (rather than Physical), and the V Bit 314 indicates if the Address is Valid. The Spin Lock 306 is a lock that prevents both the AT Sequencer 130 and the Microprocessor 114 from accessing and modifying the Next Sector Count 200N at the same time. The Next Register 190 has a Base 194N, Limit 196N, Pointer 198N and a Sector Count 200N. The Current Register 192 also has a Base 194C, a Limit 196C, a Pointer 198C and a Sector Count 200C that represents the number of valid sectors left. The AT Interface Registers also include the AT Status Logic Flags 340 and Status Bits 210. The TFR Flag 344 if set, indicates that either the Microprocessor 114 is prepared to transfer information from the Buffer Memory 118 to the Host 102 or that there has been a Cache Hit 212 and the AT Sequencer 130 is prepared to make the transfer. The NRC flag 342, or Next Register Certify flag, indicates that the contents of the Next Register 190 have been properly set up and may be transferred to the Current Register 192. The Cm.Rd.En 224, is set when the DCMU is enabled. The ACR Comp 324, CA 320, ACRinProg 322, and Cache Hit 212 bits should be interpreted as follows:

ACR Completed: Auto Cache Read Completed. This Bit is set if one or more Full Cache Hit Commands have been completed since the last time it was cleared.

Cmd Active: Command Active. This Bit is set if the Disc Controller is currently servicing a Host Command.

ACR In Prog: Cache Read in Progress. This Bit is set if the Disc Controller is currently servicing a Full Cache Hit.

Cache Hit: This Bit is set if the Disc Controller is currently servicing a Full or Partial Cache Hit.

"0100"
1. Current Command is not a Cache Hit.
2. No Cache Hit Command has been serviced by the Controller since last Command.
3. The Microcontroller should decode the Command and proceed as in a non-Cache Hit case. The Microcontroller can choose to update Cache entries if so desired.

"0101"
1. Partial Cache Hit. Current Command is a Cache Hit, but the number of sectors requested is more than the number that is currently certified in the Count field of the Cache entry.
2. No Cache Hit Command has been serviced by the Controller since last Command.
3. The Disc Controller is already servicing the request, but will wait for the remaining sectors from the Microcontroller.

"0111"
1. Full Cache Hit. Current Command is a CacheHit, and the number of sectors requested is less than the number that is currently certified.
2. No Cache Hit Command has been serviced by the Controller since last Command.
3. The Disc Controller is already servicing the request, and can complete the Command with no help from the Microcontroller.

"1000"
Current Command is a Cache Hit and the Command has been completed.

"1100"

Same as "0100" except that one or more Cache Hit Commands have been processed before the current Command. The Microcontroller can proceed as in case "0100".

"1101"

Same as "0101" except that one or more Cache Hit Commands have been processed before the current Command. The Microcontroller can proceed as in case "0101".

"1111"

Same as "0111" except that one or more Cache Hit Commands have been processed before the current Command. The Microcontroller can proceed as in case "0111".

All other combinations of these four Status Bits not listed above are illegal.

The Dedicated Comparators 240, compare the Current Sector Count 200C with zero, the Task File Sector Count 304 with zero, the Byte Counter 316 with zero, and Cmd-.S.Cnt with Next.S.Cnt. The Incrementer-Decrementer 242 increments or decrements the various Counts and Pointers when necessary. Register Access Logic 360 is provided to enable the Microprocessor 114 to access the Task File 300 and AT Interface Registers 132 and so that a number of different Registers can be incremented or decremented using a single Incrementer/Decrementer 242.

When the Host computer 102 sends a Host Command 150, the Host Command 150 is stored in the Task File 300. The Task File 300 stores the Command (CMD), Address 302 and Sector Count 304 portions of the Host Command 150 for use by the AT sequencer 130 and by the Microprocessor 114.

If the Host Command 150 is a Read Command, and the data requested is in Cache 118 and the Valid Bit V 314 is set, then the contents of Next Register 190 are loaded into the Current Register 192, the Status Flags 340 and Status Bits 210 are updated accordingly. The Current Register 192 provides the pointers and values necessary to transfer data currently located in the Disc Cache 118 to the Host computer 102. The Cache Entry 390 includes the Next Register 190 plus the Next Sector Address 310, the L and V bits 312, 314 for the Next Sector Address and the Spin Lock 306. The additional feature provided by the present invention is that in addition to the hardware providing for immediate data transfer in response to a Host Command 150, the Cache Entry 390 is updated to reference the next sequential sector stored in the disc cache, where the "next sequential sector" is the next sector after the last sector retrieved by the last Host Read Command. Instead of leaving the cache entry 390 unchanged after processing a Host Read Command, the present invention's disc controller's sequencer updates the Cache Entry 390 because further sequential accesses are more likely than repetitive accesses.

When the number of sequential sectors 304 requested by Host 102 is more than the number of sectors available in the Disc Cache Buffer Memory 118, (i.e., a Partial Cache Hit) then the Current Sector Count 200C in Register 192 is decremented to zero during the initial data transfer of data from the disc cache 118 to the Host 102. When the Sequencer 130 detects that the Current Sector Count 200C has reached zero, it stops the data transfer to the Host 102 until the Microprocessor 114 detects the status of the transfer, loads the remaining requested sectors into the Buffer Memory 118 and updates the Next Register 190 so that they can be transferred to the Host 102.

The Buffer Memory Interface 116 includes a FIFO 270, which is shown in each of FIGS. 1, 2 and 3, and which receives its Control signals from the AT Interface 110. The FIFO 270 receives the data from the Buffer Memory 118 across the Buffer Memory Interface 116 and holds it for transfer to the Host computer 102. In the preferred embodiment, the FIFO 270 holds 32 bytes of data and data is written into the FIFO 270 sixteen bytes at a time.

Every time sixteen bytes of data are transferred to the FIFO 270, an "Increment Current Ptr" signal 272 is sent by the FIFO 270 to the AT Status Logic 262, which then generates the control signals needed to update the Current Pointer 198C to point to the location of the next sixteen bytes in the Read Buffer 174. The changed value of the Current Pointer 198C accesses a next sixteen bytes of data in the Buffer Memory. When the FIFO 270 is half empty, or has space for 16 bytes of data, the FIFO 270 stores the 16 bytes of data accessed by the current value of the Current Pointer 198C, and then sends another "Increment Current Ptr" signal 272 to the AT Status Logic 262. The invention is not limited to use of a 32 bytes FIFO 270.

As each sector is being transferred to the Host 102, Decrement Byte Count signals 250 are sent from the Task File Control Circuitry 260 to the AT Status Logic 262, which is a part of the AT Sequencer 130. Every time the Decrement Byte Count signal 250 is sent to the AT Status Logic 262, the Byte Count Register 316 is properly updated. More particularly, when the Host 102 accesses the DataOut Register in the Task File 300, a Decrement Byte Count signal is generated and the AT Status Logic generates the control signals required for decrementing the Byte Count 316 in the AT Interface Registers 132.

Figure 4:
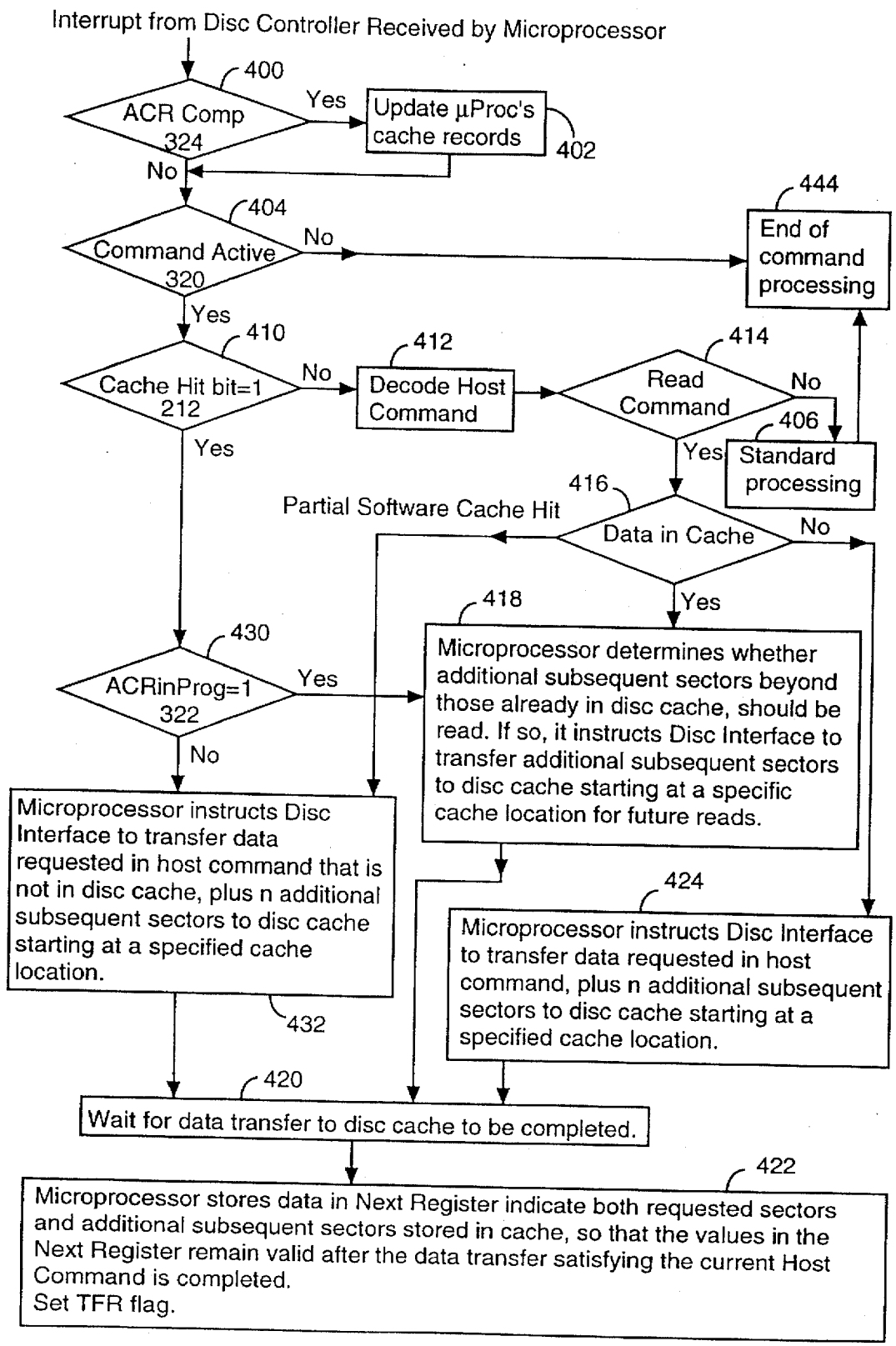
FIG. 4 is a flow chart of steps performed by the Microprocessor to service a Host Read Command.

Referring to FIGS. 1 and 4, the Host Command Decoding Program 122 executed by the Microprocessor 114 responds to Host Commands 150 other than full cache hits detected by the AT interface in accordance with the present invention and, when appropriate, sends a Host Interrupt Request 154 by setting an appropriate value in the HIRQ flag register 308 in the Task File 300. The Data Caching Program 126 executed by the Microprocessor 114 determines which data sectors to store in the disc cache buffer memory 118, initiates the process of copying data from the disc storage device 104 into a selected region of the disc cache 118, and updates the Next Sector Count 200N in Next Register 190 when data sectors have been successfully copied from the disc storage device 104 into the disc cache 118.

FIG. 4 reflects the primary changes in the Microprocessor software 120 required to implement the present invention. Generally, these changes cause the Microprocessor to check the values of the Status Bits 210 so as to determine what tasks, if any, the AT Sequencer is performing or has performed, and thus what tasks remain for the Microprocessor to perform.

When an Interrupt to the Microprocessor is received from the AT Sequencer, the first step is to check (step 400) ACR Completed 324 (Auto Cache Read Completed). As discussed before, ACR Com Bit 324 is set to 1 (yes) when one or more Full Cache Hit 212 Commands have been completed since the last time it was cleared. If ACR 324 is set to 1, the Microprocessor 114 Cache records are updated (step 402). If ACR 324 is not 1, or after Microprocessor Cache records are updated (step 402), the Command Active 320 is checked 404.

If (step 404) Command Active 320 is 0 (indicating that Disc Controller 106 is NOT currently servicing a Host Command 150), then the Microprocessor procedure jumps to the End of Command Processing (step 444) for orderly termination of the Microprocessor task. If Command Active Bit 320 is set to 1 (step 404), then the Cache Hit Bit 212 is checked (step 410). If the Disc Controller 106 is currently servicing a Full or Partial Cache Hit, then the ACRinProg flag 322 is checked at step 430.

If the Disc Controller 106 is currently servicing a Full Cache Hit (step 430), then Microprocessor 114 determines whether additional subsequent sectors, beyond those already in Disc Cache 118 should be read (step 418). If so, it instructs Disc Interface 108 to transfer additional subsequent sectors to Disc Cache 118 starting at a specified Cache location 418. After the transfer of additional sectors to the Disc Cache 118 is completed (step 420), Microprocessor 114 stores updated data in the Next Register 190 and the TFR flag 344 is set (step 422). It is noted that steps 420 and 422 may be performed multiple times during the transferring of data into the disc cache so as to allow the transfer of data to the Host to start before the last of the requested data is stored in the Disc Cache 118. For example, the Next Register could be updated after every "x" sectors are stored in the Disc Cache 118, where "x" is a fixed or dynamically determined integer value.

If (step 430) ACRinProg 322 is not set to 1, (i.e., the Disc Controller 106 is Not currently servicing a Full Cache Hit 212) then Microprocessor 114 instructs (step 432) Disc Interface 108 to transfer the data requested in Host Command 150 that is not in Disc Cache 118, plus "n" additional subsequent sectors to Disc Cache 118 starting at a specified Cache location, where "n" is either a fixed or dynamically determined integer value, as determined by the disc caching procedure. After the requested data is stored in the Disc Cache (step 420), Microprocessor 114 stores updated data in Next Register 190, and TFR flag 344 is set (step 422).

If the Disc Controller 106 is not currently servicing a Full or Partial Cache Hit (step 410), then the Host Command is decoded (step 412). If the Host Command 150 is not a Read Command (step 414) then the Microprocessor continues with its standard non-read type command processing (step 406). If (step 414) the Host Command 150 is a Read Command, then the Data in Cache is checked 416 to see if it matches the data requested (416). If a match occurs, the Microprocessor 114 determines whether additional subsequent sectors should be read (step 418). If so it instructs Disc Interface 108 to transfer (step 418) additional subsequent sectors to Disc Cache 118. After the requested data is stored in the Disc Cache (step 420), Microprocessor 114 stores updated data in Next Register 190, and TFR flag 344 is set (step 422).

If data requested was not found in the Disc Cache (step 416), then Microprocessor 114 instructs (step 424) the Disc Interface 108 to transfer the requested sectors, plus "n" additional subsequent sectors to the Disc Cache 118. After the requested data is stored in the Disc Cache (step 420), Microprocessor 114 stores updated data in Next Register 190, and TFR flag 344 is set (step 422). When there is a Partial software Cache Hit (step 416), the Microprocessor 114 instructs (step 432) the Disc Interface 108 to transfer the data requested in Host Command 150 that is not in Disc Cache 118, plus "n" additional subsequent sectors to the Disc Cache.

Figure 5:
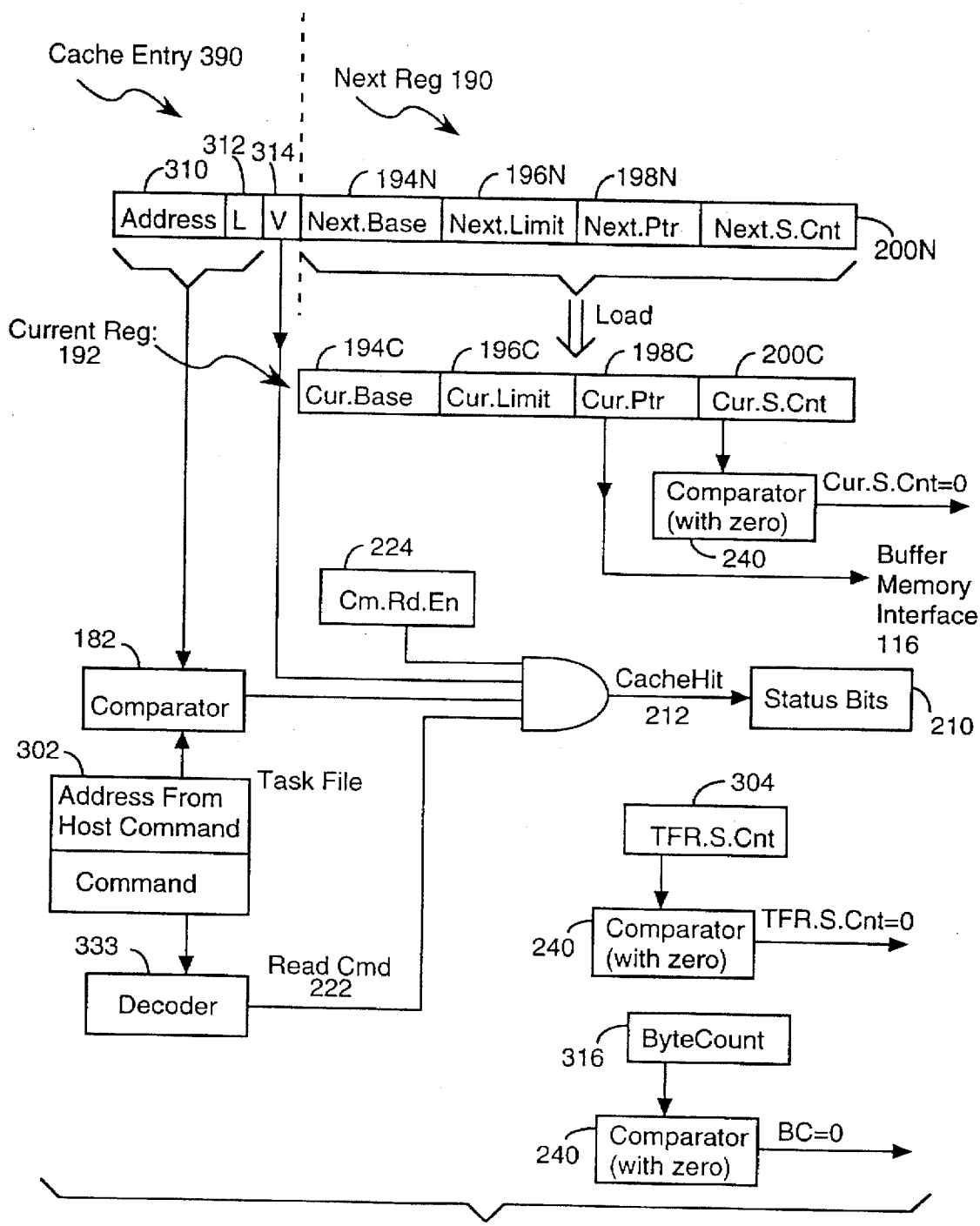
FIG. 5 is a block diagram of portions of the Status Registers and Control Logic used to implement a preferred embodiment of the present invention.

FIG. 5 illustrates the primary features of the present invention used to implement a single Cache Entry 390 version of the invention for transferring a single sequence of sectors taken from the Disc Cache 118 through the Buffer Memory Interface 116 to the Host computer 102. FIG. 5 shows the Dedicated Comparators 240, one of which keeps track of the Current Sector Count 200C in the Current Register 192, and another one of which keeps track of Task File Sector Count 304 in Task File 300. Each of the counts mentioned above are compared with zero so that completion of the transfer (or completion of a portion of the transfer) can be detected.

Figure 6:
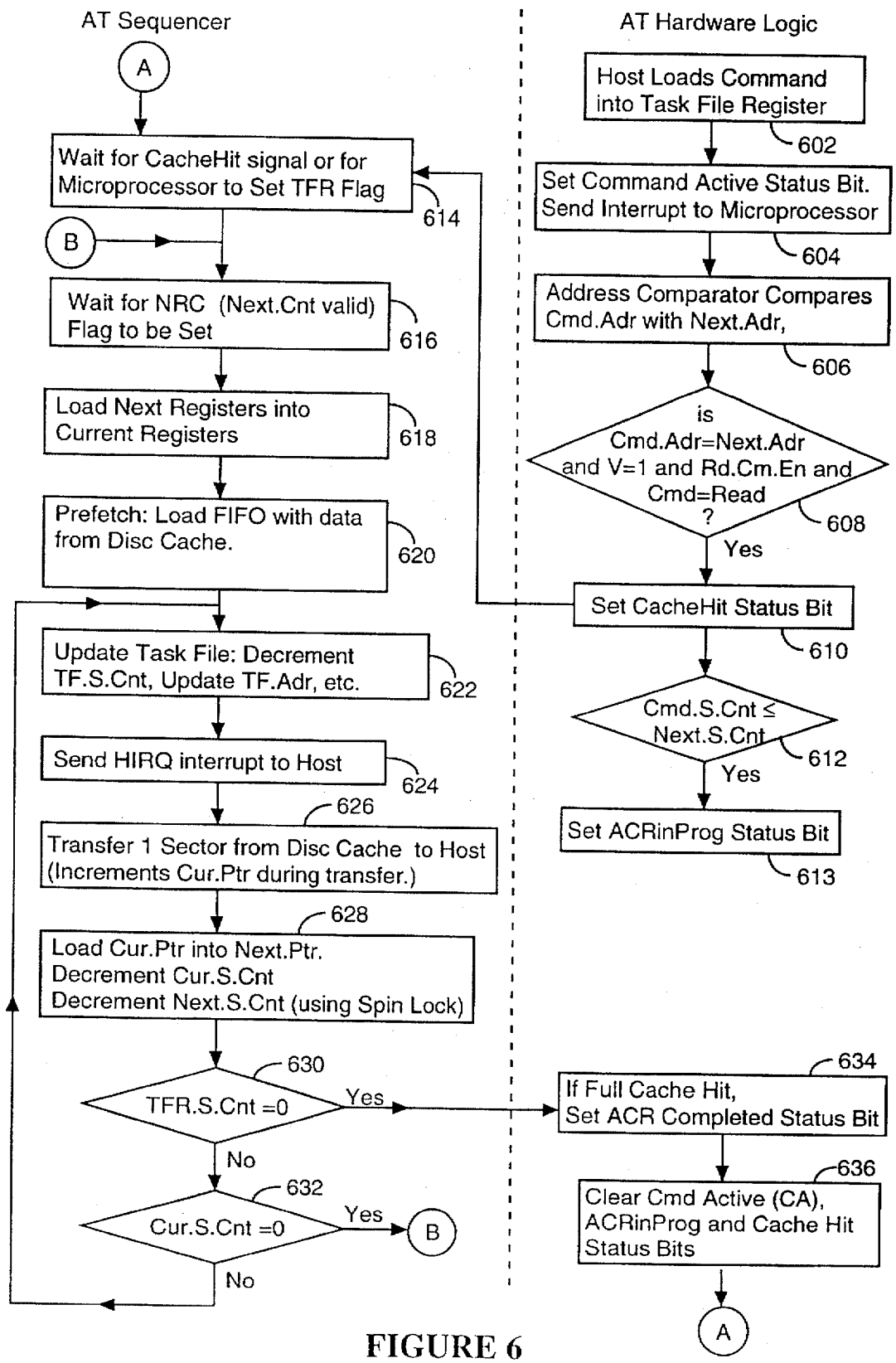
FIG. 6 is a flow chart of steps performed by the AT Sequencer and AT Hardware Logic to service a Host read command.

The sequence of operations by the AT Sequencer 130 and the AT Hardware Logic to service a Host Command is shown in FIG. 6. As shown in FIG. 5, the Cache Entry 390 includes an Address 310 and L and V Bits 312 and 314, the address being the disc address of the data where the Next Register's Next Ptr 198N is currently pointing. A Cache Hit 212 signal is produced when the Decoder 333 detects a Read Command 222, the Comparator 182 detects a match between the Address from Host Command 302 and Address 310 in the Cache Entry 390, the Valid Bit 314 is set and Cm.Rd.En 224 is set. All of the four above conditions must be present in order for the Cache Hit signal 212 to be sent. When there is a Cache Hit 212, the Status Bits 210 are updated and the values at Next. Base 194N, Next.Limit 196N, Next.Ptr 198N and Next.S.Cnt 200N are loaded from the Next Register 190, into the Current Register 192 in Cur.Base 194C, Cur.Limit 196C, Cur.Ptr 198C and Cur.S.Cnt 200C. This sequence of steps is all carried out by the AT hardware, as shown at the right-hand side of FIG. 6 in steps 602, 604, 606, 608. The final step 610 that sets the Cache Hit 212 Status Bits activates the AT Sequencer 130 to perform the sequence of steps shown on the left side of FIG. 6.

FIG. 6 is a flow chart of the data transfer process used in a preferred embodiment. When a CacheHit 212 is detected (step 610) by the AT Hardware, the Command Sector Count Cmd.S.Cnt 304 is compared 612 with Next Sector Count Next.S.Cnt 200N (step 612). If the Cmd.S.Cnt 304 is less than or equal to Next.S.Cnt 200N, then ACRinProg Status Bit 322 is set (step 613).

The AT Sequencer 130 waits (step 614) for a Cache Hit 212 signal or for the TFR flag 344 to be set by the Microprocessor. Then the Sequencer 130 then waits for the NRC flag 342 (see FIG. 3) to be set (step 616) and, as previously described, then loads (step 618) the Next Register 190 into the Current Register 192. An advantage of the present invention is that the transfer of data begins immediately upon the receipt of the Cache Hit 212 signal.

It is important to note that the FIFO 270 is loaded with data from the disc cache (step 620) automatically when the values from the Next Register 190 are loaded (step 618) into the Current Register 192. The Byte Count 316 is also set to "n" times "sz", where "n" represents the total number of sectors to be transferred before the next host interrupt and "sz" is the number of bytes in a sector (e.g., 512 bytes per sector). As described above, in the preferred embodiment, the FIFO 270 has a storage capacity of 32 Bytes and is loaded sixteen Bytes at a time.

After the Next Register 190 is copied to the Current Register 192 and the FIFO is preloaded with data, the registers in the Task File are updated 622 by decrementing the Task File Sector Count 304 (FIG. 3), updating the Task file Address 302 (FIG. 3), and so on. These registers are also updated while sectors are being transferred. The updates to the Task File 300 are made in accordance with a standard industry specification and thus is not unique to this system. Next, an HIRQ signal 154 is sent (step 624) to the Host 102 by setting the HIRQ flag 308 (FIG. 3). "n" sectors are transferred (step 626) from the Disc Cache 118 to the Host 102 at step 626, during which process the Current Pointer 198C is incremented until it points to the next sector stored in the disc cache. The way in which the AT sequencer performs step 626 is shown in greater detail in FIG. 7. As the data is transferred to the Host, the FIFO 270 is constantly being reloaded with data from the Buffer according to the Current Pointer 198C in the Current Register 192. The transfer of each "n" sectors (step 626) is carried out by virtue of hardwired logic, which is not unique to this invention. When the full set of "n" sectors is transferred, the Current Pointer 198C is loaded into the Next Pointer 198N, Current Sector Count (Cur.S.Cnt) 200C, and Next Sector Counts 200N (Next.S.Cnt) are decremented (step 628).

The Task File Sector Count 304 is checked next at step 630. If it is zero, the transfer is complete, and if the completed transfer was a "Full Cache Hit", then the ACR Complete 324 Status Bit is set. In addition, when a transfer is completed, the Command Active CA 320, ACRinProg 322 and Cache Hit 212 Status Bits 210 are cleared 636. If the Sector Count in the Task File 300 is not zero (step 630), then the Current Sector Count 200C must be checked 632 in order to continue the transfer of sectors from the Buffer Memory 118. If Cur.S.Cnt is equal to zero, then all the valid data in the Cache has been transferred, and the Sequencer 130 must await the NRC flag 342 to be set indicating that more valid data has been transferred by the Microprocessor 114 into the Disc Cache. If the Current Sector Count 200C is not equal to zero, the transfer of sectors to the Host 102 continues.

Figure 7:
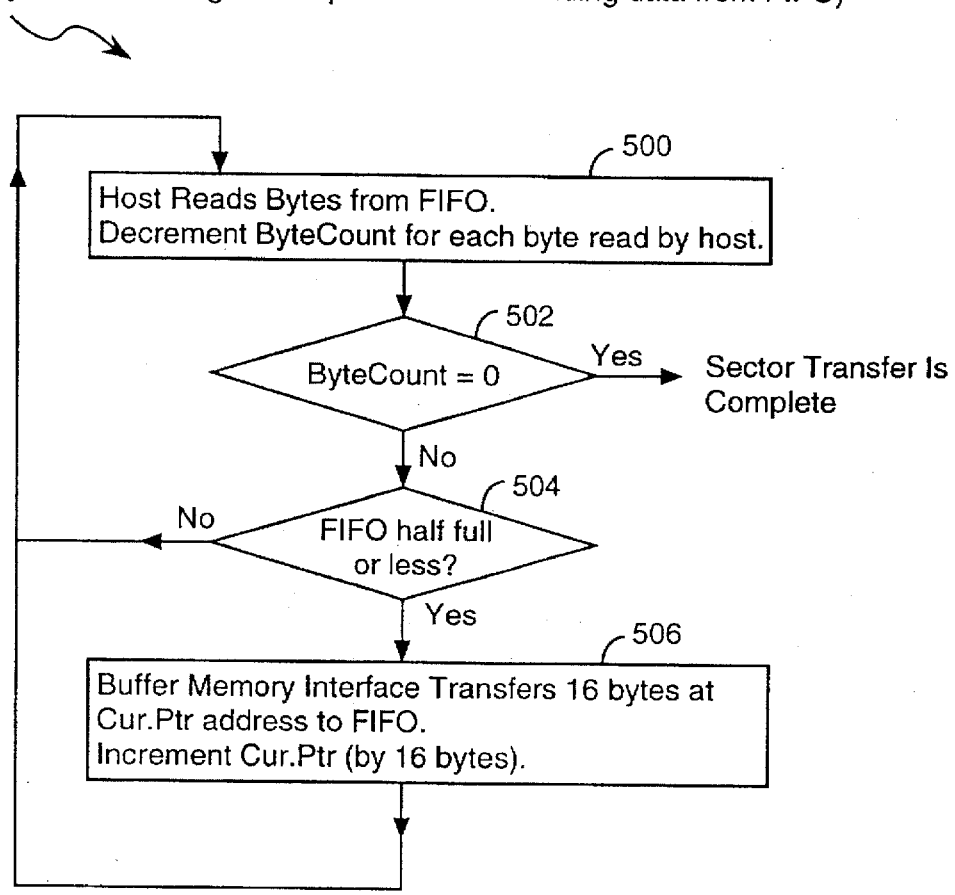
FIG. 7 is a flow chart of the process for transferring one block of data to a Host computer, performed by hardware logic.

FIG. 7 is the detailed flow chart of the steps taken in step 626 of FIG. 6. This Figure is provided primarily to show how the Byte Count 316 is constantly decremented to determine, at steps 500, 502, whether the total bytes requested by the Host Command 150 have been transferred, and how the FIFO 270 is utilized to increment the Current Pointers 198C, at steps 504, 506. These steps are performed by hardwired logic in the AT sequencer, not by software.

ALTERNATE EMBODIMENTS

Figure 8:
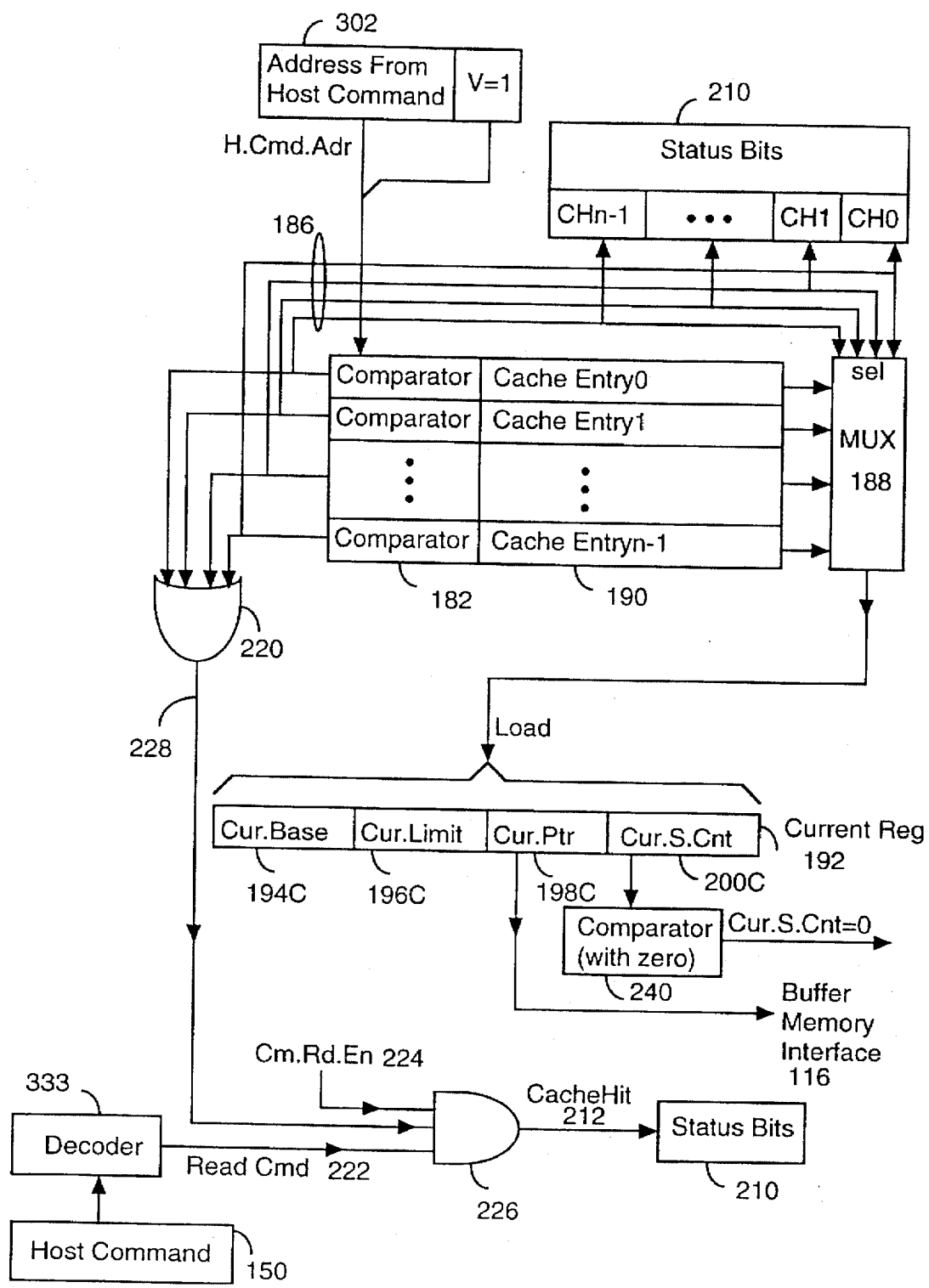
FIG. 8 is a block diagram of a second preferred embodiment of the present invention.

FIG. 8 represents an alternative implementation of the present invention. One of the primary objectives of the present invention is to eliminate constant intervention by the Microprocessor 114, as such interventions dramatically slow down the rate of data transfer from the Disc Storage 104 and the Buffer Memory 118, to the Host computer 102.

It is anticipated that in some embodiments of the present invention the Disc Controller 106 will use two or more Cache Entries 390. Cache Entry0 stores information for Disc sectors in the Disc Cache 118 that are subsequent to one Host Read Command 222, Cache Entry1 stores information for Disc sectors in the Disc Cache 118 that are subsequent to another Host Read Command 222, and so on. In particular, each time a Host Read Command 222 is received that is not "sequential" (i.e., is not requesting sectors starting immediately after the last sector read), the Microcontroller uses a Cache Entry 390 for storing information about sectors subsequent to the requested sectors that have been stored in the Disc Cache 118.

FIG. 8 illustrates the circuitry for locating any sequence of sectors stored in the Read Buffers 174 in the Buffer Memory 118 by providing registers (i.e., Cache Entry Registers) for storing the address of the first sector of each sequence of sectors stored in each of the four Read Buffers 0–3 (shown in FIG. 3) and an associated Comparator 182 for each Cache Entry 390. Each of the Comparators 182 receives an Address from Host Command 302. The Valid Bit V 314 (not shown in FIG. 8) of each Cache Entry 390 must be set to 1 (address is valid) for the corresponding Comparator 182 to accept it. Each of the Comparators 182 receives Address from Host Command 302 and the address is compared to Cache Entry 390, address. If the Address 302 matches any Cache Entry 390, the Comparator 182 associated with that Cache Entry 390 sends a Selector Signal SEL on one of lines 186 to MUX (Multiplexer) 188 to indicate that a match has occurred and to select the corresponding Cace Entry 390 to be loaded by the MUX 188 into the Current Register 192. The cached disc data referenced by the Current Register 192 is transferred to Host 102 using the same mechanisms as described above.

The cache hit selection signals on lines 186 are stored as additional Status Bits 210, labelled in FIG. 8 as CH0 to CHn−1 to indicate the Cache Entry, if any, for which a cache hit has been detected. The selection signals on lines 186 are also sent as inputs to an OR Gate 220, The OR Gate 220 functions as follows: if any of the selection signals are set (equal to 1) then the OR Gate 220 will generate an output of 1. Therefore, the output 228 of OR Gate 220 is set to 1 when any of the Comparators 182 generates a selection signal, indicating an address match. Output 228 is one of the inputs to the AND Gate 226. The other inputs to the AND Gate 226 are (A) the signal from the Decoder 333 indicating that the Host Command 150 is a Read Command 222, and (B) the Cm.Rd.En flag 224, which is the Cache memory Read Enable flag. In order for the AND Gate 226 to output a Cache Hit Signal 212, all of Cm.Rd.En 224, output 228 and Read Command 222 must be set to 1 (true). Thus, the AND Gate 226 will signal a Cache Hit 212 when there has been an address match as indicated by a True signal on line 228, the Host Command 150 is a Read Command 222, and Cm.Rd.En 224 has been enabled. When a Cache Hit 212 occurs, the Status Bits 210 are updated accordingly, as explained above with reference to the first preferred embodiment of the present invention.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, while the preferred embodiment is based on an AT Interface, the present invention would be equally effectively implemented using other types of interfaces such as SCSI interfaces and the like.

What is claimed is:

1. A disc drive controller for use with a disc storage device and a host, the disc drive controller comprising:

a disc interface coupling the disc drive controller to the disc storage device;

a cache memory storing data blocks;

registers storing status information, including a cache entry register that stores information identifying a sequence of said data blocks in said cache memory including an address, a count value indicating how many data blocks are in said sequence of data blocks, and cache position information indicating where in said cache memory said sequence of data blocks is stored;

a host interface for receiving host commands from the host, said host commands including read commands wherein each read command specifies a requested set of data blocks by specifying an address and a number of data blocks;

a microprocessor coupled to said disc interface and said registers, said microprocessor controlling said disc interface so as to retrieve data blocks from the disc storage device and to store said retrieved data blocks in said cache memory, said retrieved data blocks including additional data blocks subsequent to said requested set of blocks of data; said microprocessor furthermore storing in said cache entry register data identifying said additional data blocks;

cache hit detection circuitry coupled to said host interface and registers for comparing said address specified by each said read command received from the host computer with said information stored in said cache entry register and for generating a cache hit signal when a match is detected; and data transfer circuitry, coupled to said cache hit detection circuitry, for automatically generating a host interrupt request signal and transferring to the host at least a subset of said requested set of data blocks specified by said each read command when said cache hit signal is generated without further intervention by said microprocessor.

2. The disc drive controller of claim 1, wherein said disc storage device comprises a secondary memory device having an access time that is at least ten times longer than that of random access memory in said host.

3. The disc drive controller of claim 1, wherein said data transfer circuitry includes circuitry for updating said information stored in said cache entry register so that said updated information stored in said cache entry register identifies data blocks in said cache memory sequentially subsequent to those data blocks transferred to the host.

4. A method of operating a disc drive storage device coupled to a host, the steps of the method comprising:

storing data blocks retrieved from said disc drive storage device in a cache memory;

storing status information, including a cache entry register that stores information identifying a sequence of said data blocks in said cache memory;

an address, a count value indicating how many data blocks are in said sequence of data blocks, and cache position information indicating where in said cache memory said sequence of data blocks is stored;

receiving host commands from the host, said host commands including read commands wherein each read command specifies a requested set of data blocks by specifying an address and a number of data blocks;

providing a microprocessor for retrieving data blocks from the disc storage device and for storing said retrieved data blocks in said cache memory, said retrieved data blocks including additional data blocks subsequent to said requested set of blocks of data; said microprocessor furthermore storing in said cache entry register data identifying said additional data blocks;

utilizing logic circuitry to compare said addresses specified by each said read command received from the host with said information stored in said cache entry register and to generate a cache hit signal when a match is detected; and automatically, without waiting for said microprocessor to process said each read command, generating a host interrupt request signal and transferring to the host at least a subset of said requested set of data blocks specified by said each read command when said cache hit signal is generated.

5. The method of claim 4, wherein said disc storage device comprises a secondary memory device having an access time that is at least ten times longer than that of random access memory in said host.

6. The method of claim 4, further including updating said information stored in said cache entry register so that said updated information stored in said cache entry register identifies data blocks in said cache memory sequentially subsequent to those data blocks transferred to the host.

7. A disc drive controller for use with a disc storage device and a host, the disc drive controller comprising:

a disc interface coupling the disc drive controller to the disc storage device;

a cache memory storing data blocks;

registers storing status information, including a cache entry register that stores information identifying a sequence of said data blocks in said cache memory;

a host interface for receiving host commands from the host, said host commands including read commands wherein each read command specifies a requested set of data blocks by specifying an address and a number of data blocks;

a microprocessor coupled to said disc interface and said registers, said microprocessor controlling said disc interface so as to retrieve data blocks from the disc storage device and to store said retrieved data blocks in said cache memory, said retrieved data blocks including additional data blocks subsequent to said requested set of blocks of data; said microprocessor furthermore storing in said cache entry register data identifying said additional data blocks;

cache hit detection circuitry coupled to said host interface and registers for comparing said address specified by each said read command received from the host computer with said information stored in said cache entry register and for generating a cache hit signal when a match is detected;

data transfer circuitry, coupled to said cache hit detection circuitry, for automatically generating a host interrupt request signal and transferring to the host at least a subset of said requested set of data blocks specified by said each read command when said cache hit signal is generated without further intervention by said microprocessor;

each read command specifies a request block count representing how many data blocks the host is requesting;

said information stored in said cache entry register includes a cached data block count representing how many data blocks are in said sequence of data blocks in said cache memory;

said data transfer circuitry includes circuitry for comparing said request block count in each said read command with said cached data block count and for updating a first status bit, accessible by said microprocessor, when a cache hit signal has been generated, said first status bit updated to indicate whether or not said request block count is larger than said cached data block count; and said microprocessor including means for accessing said first and second status bits and for processing each said host command in accordance therewith.

8. The disc drive controller of claim 7 wherein said cache hit detection circuitry includes circuitry for updating a second status bit, accessible by said microprocessor, to indicate when a cache hit signal has been generated; said microprocessor including means for accessing said first and second status bits and for processing each said host command in accordance therewith.

9. A method of operating a disc drive storage device coupled to a host, the steps of the method comprising:

storing data blocks retrieved from said disc drive storage device in a cache memory;

storing status information, including a cache entry register that stores information identifying a sequence of said data blocks in said cache memory;

an address, a count value indicating how many data blocks are in said sequence of data blocks, and cache position information indicating where in said cache memory said sequence of data blocks is stored;

receiving host commands from the host, said host commands including read commands wherein each read command specifies a requested set of data blocks by specifying an address and a number of data blocks;

providing a microprocessor for retrieving data blocks from the disc storage device and for storing said retrieved data blocks in said cache memory, said retrieved data blocks including additional data blocks subsequent to said requested set of blocks of data; said microprocessor furthermore storing in said cache entry register data identifying said additional data blocks;

utilizing logic circuitry to compare said addresses specified by each said read command received from the host with said information stored in said cache entry register and to generate a cache hit signal when a match is detected;

automatically, without waiting for said microprocessor to process said each read command, generating a host interrupt request signal and transferring to the host at least a subset of said requested set of data blocks specified by said each read command when said cache hit signal is generated; and wherein each read command specifies a request block count representing how many data blocks the host is requesting;

said information stored in said cache entry register includes a cached data block count representing how many data blocks are in said sequence of data blocks in said cache memory;

said method further includes comparing said request block count in each said read command with said cached data block count and updating a first status bit, accessible by said microprocessor, when a cache hit signal has been generated, said first status bit updated to indicate whether or not said request block count is larger than said cached data block count; and said microprocessor accessing said first and second status bits and processing each said host command in accordance therewith.

10. The method of claim 9, including updating a second status bit, accessible by said microprocessor, to indicate when a cache hit signal has been generated, said microprocessor accessing said first and second status bits and processing each said host command in accordance therewith.

* * * * *